United States Patent
Morrison et al.

(10) Patent No.: US 9,220,392 B2
(45) Date of Patent: Dec. 29, 2015

(54) FILTER AND APPLIANCES INCLUDING THE FILTER

(75) Inventors: John Richard James Morrison, Auckland (NZ); Anthony John Green, Wellington (NZ)

(73) Assignee: FISHER & PAYKEL APPLIANCES LIMITED, Auckland (NZ)

(*) Notice: Subject to any disclaimer, the term of this patent is extended or adjusted under 35 U.S.C. 154(b) by 916 days.

(21) Appl. No.: 13/131,104

(22) PCT Filed: Nov. 26, 2009

(86) PCT No.: PCT/NZ2009/000264
§ 371 (c)(1),
(2), (4) Date: Sep. 8, 2011

(87) PCT Pub. No.: WO2010/062202
PCT Pub. Date: Jun. 3, 2010

(65) Prior Publication Data
US 2012/0024773 A1 Feb. 2, 2012

Related U.S. Application Data (60) Provisional application No. 61/118,572, filed on Nov. 28, 2008.

(51) Int. Cl.
*B01D 35/28* (2006.01)
*B01D 21/00* (2006.01)
(Continued)

(52) U.S. Cl.
CPC .......... *A47L 15/4208* (2013.01); *A47L 15/4204* (2013.01); *B01D 29/01* (2013.01); *B01D 36/04* (2013.01); *D06F 39/007* (2013.01); *D06F 39/083* (2013.01); *D06F 39/10* (2013.01)

(58) Field of Classification Search
CPC ..... D06F 39/10; D06F 58/22; B01D 21/0012; B01D 21/0039; B01D 29/01; B01D 21/0042; B01D 21/0048; B01D 21/0057; B01D 21/0063; B01D 21/0068
USPC ......... 210/167.01, 171, 406, 407, 409, 416.1, 210/12.13
See application file for complete search history.

(56) References Cited

U.S. PATENT DOCUMENTS 2,509,300 A * 5/1950 Hendrickson .................. 55/305
3,466,901 A 9/1969 Reid
(Continued)

FOREIGN PATENT DOCUMENTS

EP 0240911 10/1987
EP 0665320 8/1995
(Continued)

OTHER PUBLICATIONS

International Search Report completed Mar. 9, 2010 for International Application No. PCT/NZ2009/000264 (3 pages).

*Primary Examiner* — Nam Nguyen
*Assistant Examiner* — Claire Norris
(74) *Attorney, Agent, or Firm* — Clark Hill PLC (57) ABSTRACT

A filter for use in a washing appliance is disclosed. The filter includes an inlet, an outlet, a filter chamber and a mesh strainer placed between the inlet and outlet. The mesh strainer strains water or liquid flowing into the filter as the water flows into the inlet and out of the outlet. The mesh strainer filters out particulate matter from the flow through the filter. The liquid flowing into the filter flows across the mesh to clean the filter and dislodge at least some of the particulate matter trapped in the mesh. The filter chamber includes at least one baffle within it. The baffle divides the filter chamber into an upper portion and lower portion. The particulate matter washed off collects in the lower portion of the filter chamber due to rotational flows created in the filter due to the filter chamber boundaries and the baffles.

16 Claims, 6 Drawing Sheets

(51) Int. Cl.
*D06F 29/00* (2006.01)
*A47L 15/42* (2006.01)
*B01D 29/01* (2006.01)
*B01D 36/04* (2006.01)
*D06F 39/00* (2006.01)
*D06F 39/08* (2006.01)
*D06F 39/10* (2006.01)

(56) References Cited

U.S. PATENT DOCUMENTS

| | | | | |
|---|---|---|---|---|
| 3,681,947 | A | * | 8/1972 | Cowan ............... 68/18 F |
| 3,684,096 | A | | 8/1972 | Kretchman |
| 3,727,435 | A | | 4/1973 | Menk |
| 3,891,548 | A | * | 6/1975 | Marcussen ............... 210/791 |
| 4,476,021 | A | * | 10/1984 | Souza ............... 210/307 |
| 4,833,900 | A | | 5/1989 | Babuin et al. |
| 5,333,631 | A | | 8/1994 | Kirkland et al. |
| 5,989,418 | A | * | 11/1999 | Shin ............... 210/167.01 |
| 6,016,610 | A | * | 1/2000 | Sears ............... 34/82 |
| 6,029,479 | A | | 2/2000 | Pattee |
| 6,101,741 | A | * | 8/2000 | Sears ............... 34/417 |
| 6,253,584 | B1 | | 7/2001 | Shin |
| 6,511,595 | B2 | * | 1/2003 | Crompton et al. ............... 210/162 |
| 6,527,958 | B1 | * | 3/2003 | Carli et al. ............... 210/670 |
| 6,820,447 | B2 | | 11/2004 | Thies et al. |
| 7,073,520 | B2 | | 7/2006 | Zanello et al. |
| 2002/0002909 | A1 | | 1/2002 | Frey et al. |
| 2005/0120758 | A1 | | 6/2005 | Thies et al. |
| 2007/0000292 | A1 | * | 1/2007 | Park et al. ............... 68/13 A |
| 2008/0196452 | A1 | | 8/2008 | Bae et al. |
| 2008/0216520 | A1 | | 9/2008 | Yoo et al. |

FOREIGN PATENT DOCUMENTS

| | | |
|---|---|---|
| EP | 1390577 | 2/2004 |
| EP | 1598471 | 11/2005 |
| JP | 07-204386 | 8/1995 |
| JP | 09-313779 | 12/1997 |
| JP | 2000-334198 | 12/2000 |
| JP | 2005-058779 | 3/2005 |
| KR | 1014974 | 12/2007 |
| WO | 2006126478 | 11/2006 |

* cited by examiner

FILTER AND APPLIANCES INCLUDING THE FILTER

This application is a United States National Phase filing of PCT/NZ2009/000264, having an International filing date of Nov. 26, 2009 which was published in English on Jun. 3, 2010 under International Publication Number WO 2010/062202 which claims the benefit of U.S. provisional patent application Ser. No. 61/118,572, filed on Nov. 28, 2008. These applications are hereby incorporated by reference in their entirety.

FIELD OF THE INVENTION

The invention relates to a filter for use in a washing appliance in particular the filter is particularly suited for use in domestic dishwashing or laundry appliances. The invention also relates to the appliances including the filter.

SUMMARY OF THE PRIOR ART

Filters are necessary in washing appliances to ensure the cleanliness of the water being used. Many laundry washing appliances re-circulate the water used to wash the desired wash articles, in order to save water. It is desirable to remove debris and particulate matter from the re-circulated wash liquor.

Many washing appliances are used in hard water conditions. The hard water can cause scale or scum build up on the appliance surfaces and adversely affect wash performance by precipitating with the detergents used. Water softening units are frequently incorporated to soften the wash water entering the machine and reduce these effects. However over a long term the water softener performance can be adversely affected by contamination and clogging by solid particles entering in the mains supply water.

SUMMARY OF THE INVENTION

An object of the present invention is to provide a filter particularly for use in washing appliance which goes someway toward overcoming the above disadvantages or which will at least provide the public with a useful alternative; or to provide an appliance including such a filter.

In a first aspect the invention may broadly be said to comprise of a filter for use in a washing appliance, the filter comprising:

a filter chamber with an inlet to receive water, and an outlet to discharge water a mesh strainer in an upper portion of the filter chamber and oriented relative to the water inlet such that water flowing into the filter chamber from an inlet flows across the mesh strainer, the mesh strainer filtering particulate matter from water flowing through it to the outlet, wherein in use the flow of water across the mesh strainer causes particulate matter trapped on the mesh strainer to be dislodged, and dislodged matter settling to a lower portion of the filter chamber.

Preferably the upper portion of the filter chamber is substantially but not completely divided from a lower portion of the filter chamber, with a constricted flow path between the upper and lower portions.

Preferably a baffle divides the filter chamber into the upper and the lower portions, and the constricted flow path passes the baffle.

Preferably the baffle is angled toward the bottom of the filter chamber at an angle between 20 degrees and 90 degrees relative to a vertical wall of the filter chamber, so as to guide at least part of a flow of water within the filter chamber toward the lower portion of the filter chamber.

Preferably the upper portion of the filter chamber is shaped to cause a rotational flow within the upper and lower portions of the filter chamber.

Preferably some of the flow enters into the upper portion of the filter chamber tangential to the mesh strainer and deflects off the walls of the filter chamber to form a rotational flow.

Preferably the rotational flow within the filter chamber assists the movement of particulate matter within the filter chamber to the lower portion of the filter chamber.

Preferably the rotational flows of water within the filter chamber pass across the mesh strainer.

Preferably the lower portion of the filter chamber tapers toward a point in one direction such that one wall of the lower portion of the filter chamber is angled toward the bottom of the filter chamber relative to the other wall.

Preferably the lower portion of the filter chamber is shaped to establish a rotational flow within the lower chamber of the filter Preferably the rotational flow within the lower portion of the filter chamber is contra rotating to the flow in the upper portion of the filter chamber.

Preferably the flow within the lower portion of the filter chamber forms two zones of rotational flow, the flow in one zone being contra-rotating to the flow in the upper portion of the filter chamber while the flow in the other zone rotating parallel to the flow in the upper portion of the filter chamber.

Preferably the rotational flow is caused by the boundary shape of the filter chamber, the inlet flow having a flow momentum, said inlet flow bouncing off the solid boundaries of said filter chamber and forming a rotational flow.

Alternatively the rotational flows are caused due to the pressure differences within the upper and lower portions of the filter chamber and the outlet, the pressure increasing as more particulate matter accumulates on the mesh strainer.

Preferably the rotational flow within the filter chamber is caused due the flow deflecting off the walls of the upper portion or lower portion and the baffle within the filter chamber to create a rotational flow within the upper and lower portion of the filter chamber.

Preferably the filter body comprises a substantially transparent material.

Preferably the filter includes a substantially transparent window disposed about the lower part of the filter chamber.

Preferably the filter including a collection chamber at the bottom of the filter chamber to collect particulate matter within the filter chamber.

Preferably the collection chamber is detachable from the filter chamber.

Preferably the filter experiences substantial suction through the inlet once the inlet supply is switched off.

Preferably a substantial suction through the inlet causes substantial amounts of particulate matter trapped within the mesh strainer to be sucked out of the mesh strainer and out through the inlet.

In a second aspect the invention may broadly be said to comprise a washing appliance including a filter as described in the above statements.

Preferably the filter is situated upstream to a water softener.

Preferably the washing appliance is a clothes washing appliance, and the filter is in line with a re-circulating wash pump.

Inventions herein may also be said broadly to consist in the parts, elements and features referred to or indicated in the specification of the application, individually or collectively, and any or all combinations of any two or more of said parts, elements or features, and where specific integers are mentioned herein which have known equivalents in the art to which this invention relates, such known equivalents are deemed to be incorporated herein as if individually set forth.

The term "comprising" as used in the specification means "consisting at in part of". When interpreting each statement in this specification that includes the term "comprising", features other than that or those prefaced by the term may also be present. Related terms such as "comprise" and "comprises" are to be interpreted in the same manner.

DETAILED DESCRIPTION

The present invention relates to a filter for use in a washing appliance. The filter is most suitable for use in washing appliances including dishwashers or clothes laundering machines. The filter is structurally similar whether it is used in a dishwasher or clothes laundering machines. The filter is described in relation to a dishwashing appliance and a laundering appliance for illustrative purposes.

Figure 1:
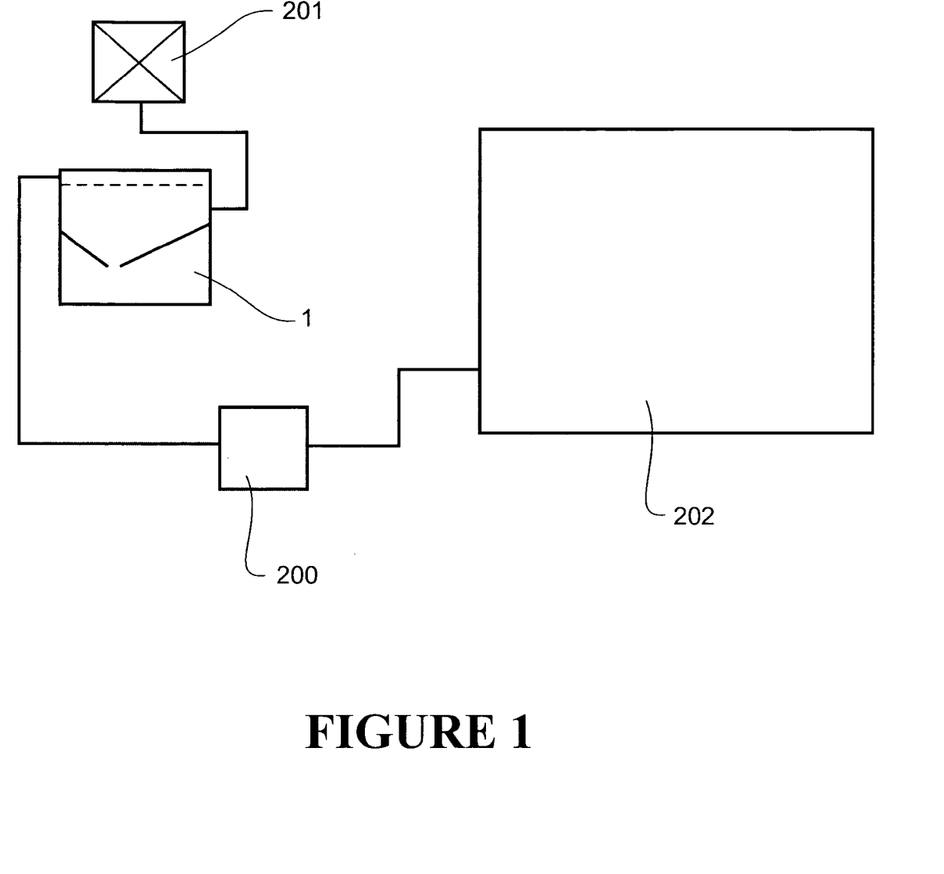
FIG. 1 is a block diagram illustrating the location of a filter in the inlet supply of an appliance such as a dishwasher.

Referring to FIG. 1 the system includes a water softener 200, connected upstream of a washing appliance wash chamber 202. The filter 1 is connected up stream of the water softener 200. A flow restrictor 201 is connected to the filter 1 and is used to control the velocity and amount of water flowing into the filter 1.

Mains water flows through the flow restrictor to the filter. The flow restrictor may be a valve but could be any other mechanism to control the amount of water delivered to the filter. Solids and particulate matter within the mains water is filtered out by the filter. The filtered water flows from the filter to the water softener.

The water softener softens the water to reduce any scale or scum build up on the appliance surfaces. Hard water can adversely affect the performance of the dishwashing appliance due to its reaction with detergents. The reaction of hard water with detergents can cause scale to form in the dishwashing appliance. This scale can adversely affect the performance of the dishwashing appliance. In the long term the performance of the water softener can be adversely affected due to contamination and clogging due to solids and particulate matter present within the mains water as it enters the water softener.

The filter 1 filters out a majority of the solid matter from the mains water before it enters the water softener in order to prevent long term damage to the water softener. The filter is intended to have capacity for the typical life time of the machine without requiring replacement, care or maintenance. However, in an alternative embodiment, the filter is cleanable so that solids and particulate matter collected in the filter can be removed.

Figure 2:
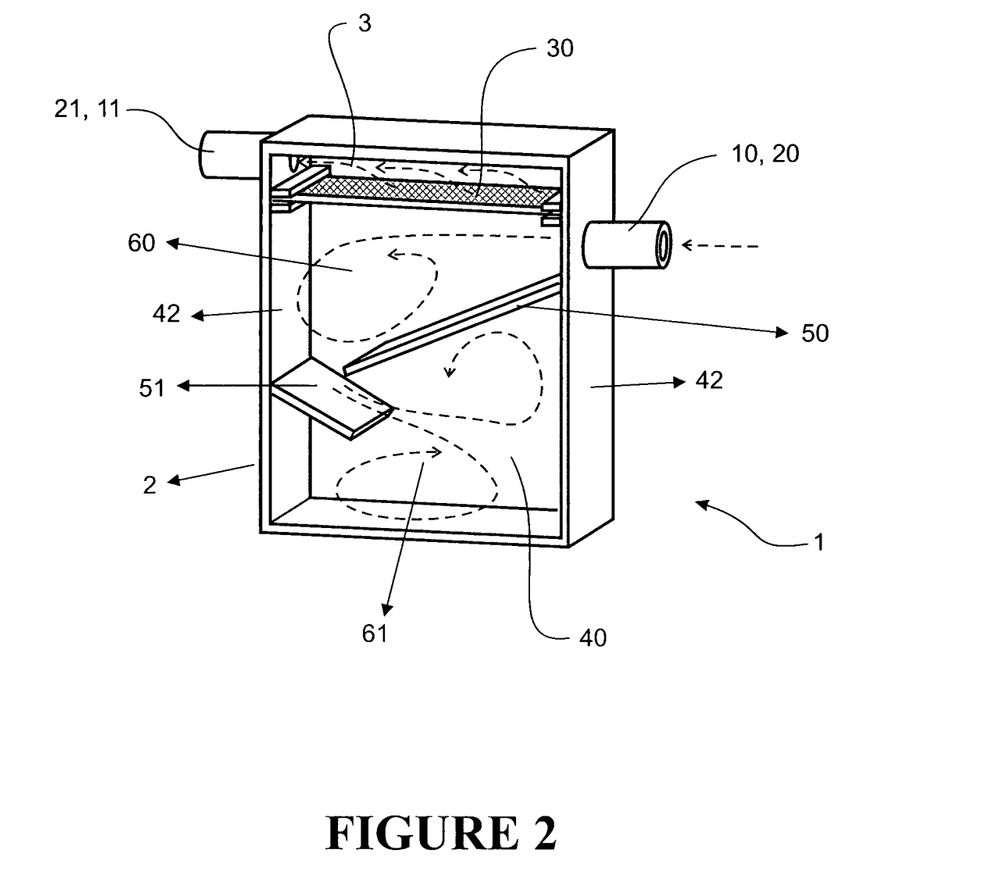
FIG. 2 is a perspective view with front cut away that shows a preferred filter. The figure shows a housing, a filter chamber within the housing, baffles within the filter chamber and a mesh strainer housed within the filter chamber.

FIG. 2 shows an embodiment of the filter 1 in more detail. The filter includes a housing 2, a mesh strainer assembly 3. These parts are assembled together to form the filter 1.

The housing 2 forms the main geometry of the filter 1.

The housing 2 includes an inlet 10 to receive water and an outlet 11 to expel water. The inlet 10 is configured to be connected to a water delivery pipe (not shown). The inlet may include an approximately cylindrical protrusion or spigot 20 that extends from the body. Preferably the protrusion has threads so that a threaded fitting of an inlet pipe and can be attached to the housing 2 by a screw connection. Alternatively the inlet pipe may be attached to the housing 2 by a friction fit, or clamp.

The outlet may also have an approximately cylindrical protrusion 21 or spigot to engage with an outlet pipe (not shown). The spigot may be threaded to allow a fitting of the outlet pipe to be screwed onto the outlet spigot. Alternatively the outlet pipe may be attached to the outlet by a friction fit or clamp.

In the first preferred embodiment the housing 2 is manufactured out of rigid, corrosion and chemical resistant polymer material. For example the housing 2 may be made of a polypropylene polymer.

Figure 4:
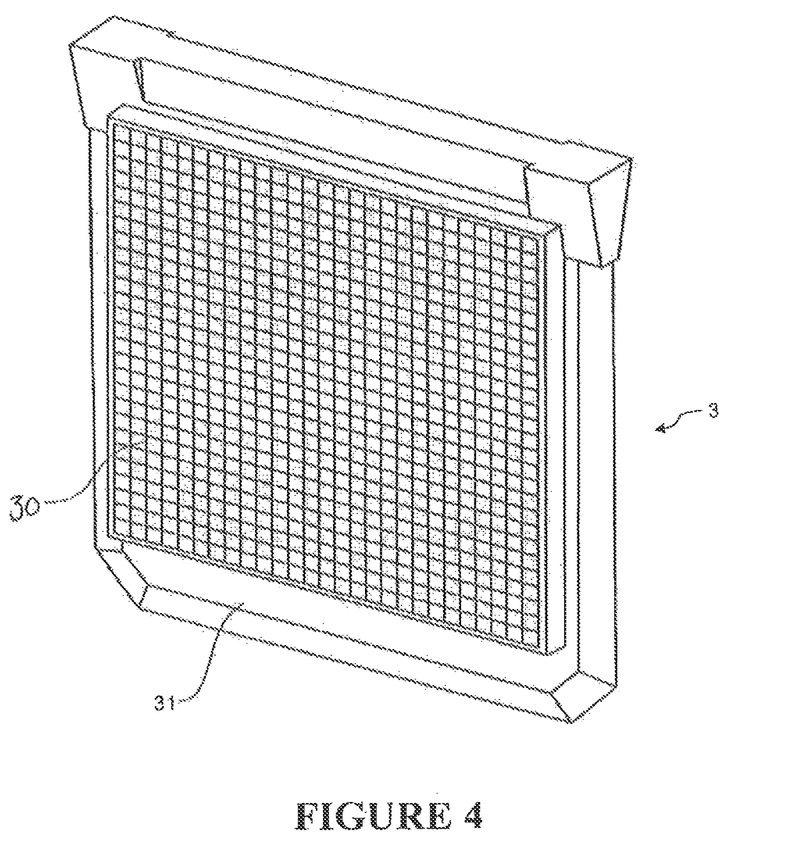
FIG. 4 is a perspective view of a mesh strainer assembly. The mesh strainer assembly contains a mesh strainer and a supporting frame.

A mesh strainer assembly 3 is fitted within the housing 2. Preferably the mesh strainer assembly 3 is held in place around its periphery by a channel. All water passing from the inlet to the outlet flows through the mesh strainer assembly 3 before exiting through the outlet 11. The mesh strainer assembly 3 comprises a mesh strainer 30 and an overmolded frame 31 as seen in FIG. 4.

The mesh strainer 30 is a lattice of holes that forms a barrier through which particulate matter greater than approximately 0.4 mm in diameter cannot permeate. Preferably the mesh strainer 30 is made of stainless steel because stainless steel is substantially corrosion resistant and due its strength properties. Alternatively the mesh strainer 30 may be made of plastics or any other corrosion resistant material.

The mesh strainer overmold 31 provides rigidity and support for the mesh strainer. The mesh strainer overmold 31 holds the shape of the mesh strainer and is suitable to support a force of 20 N or more from water flowing through it or across it. In the first preferred embodiment the mesh strainer overmold 31 is made of a suitable plastic.

The housing 2 defines a filter chamber 40. The filter chamber 40 is adapted to receive water from the water inlet 10 and expel filtered water through outlet 11. The mesh strainer 30 described above is housed in the upper part of the filter chamber 40.

Figure 3:
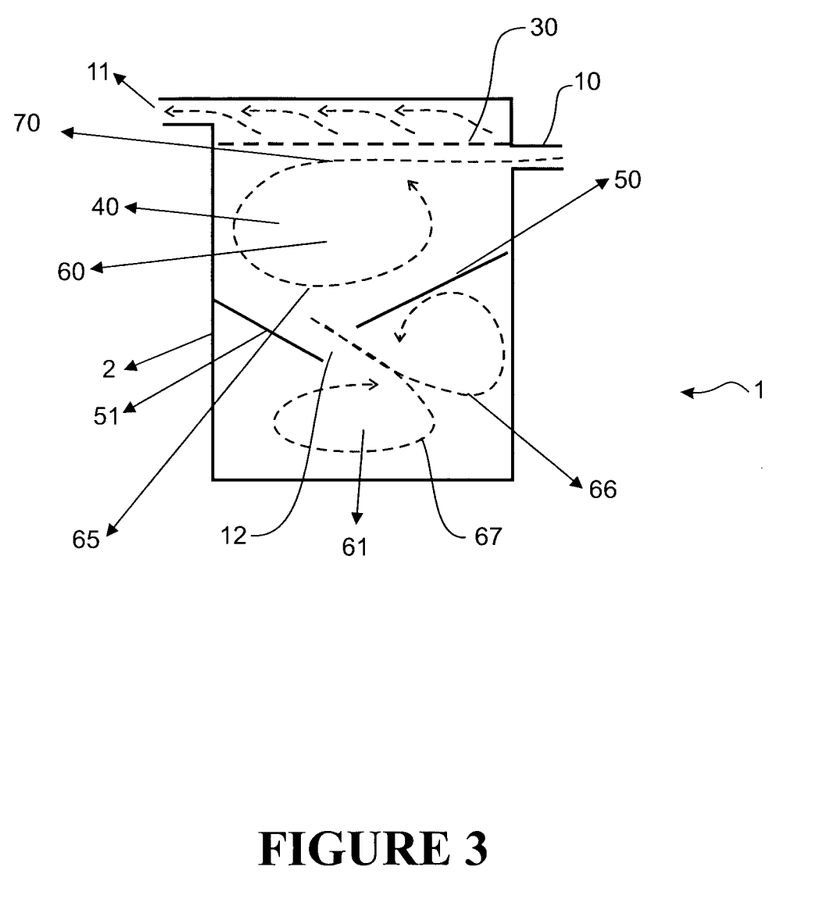
FIG. 3 shows a diagram illustrating flow paths the water takes through the filter.
Figure 5:
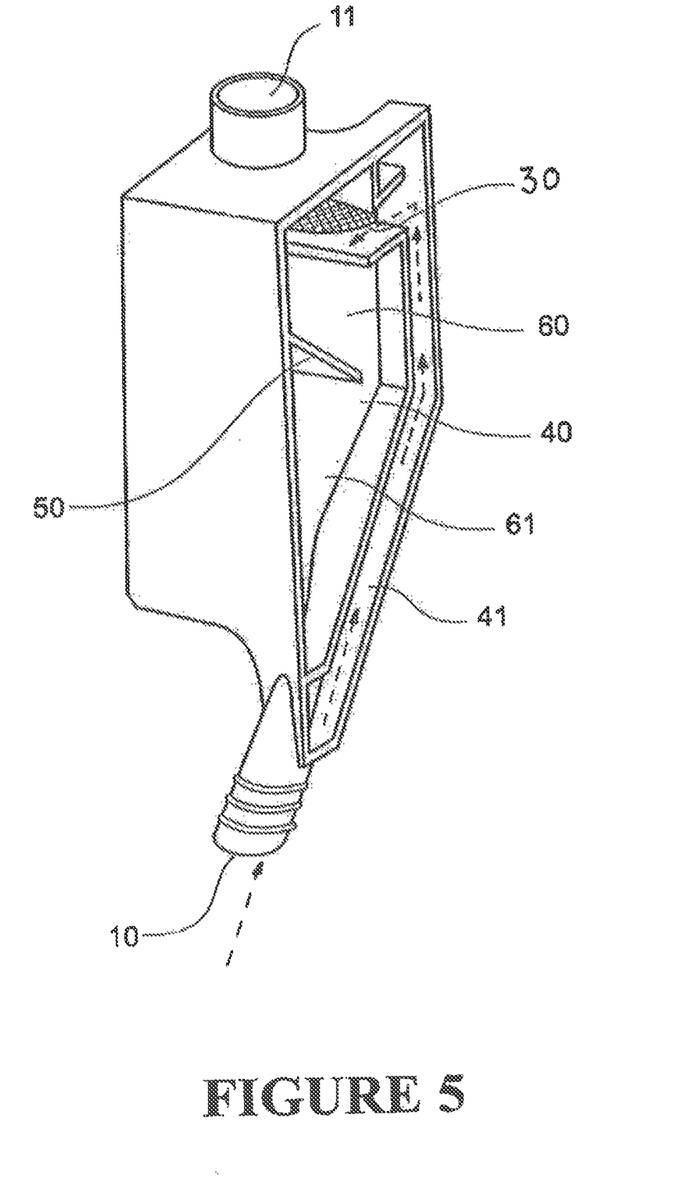
FIG. 5 is a perspective view showing an alternate shape of the housing. The housing provides a tapered lower portion of the filter chamber and a channel that guides the water from the inlet to the mesh strainer.

The water inlet 10 may be displaced from the filter chamber. In the embodiment of FIG. 5 the housing 3 includes a channel 41. The channel 41 guides water from the inlet 10 to the filter chamber 40 and the mesh strainer 30 for filtering. Alternatively the water may enter the filter chamber directly from the inlet as seen in FIGS. 2 and 3.

In the preferred form, the upper portion of the filter chamber 40 is substantially but not completely divided from the lower portion of the filter chamber 40, with a constricted flow path between the upper and lower portions.

The upper and lower portions of the filter chamber 40 may be divided by one or more baffles 50, 51 to create the constricted flow path between the upper and lower portion. The baffles will be described later in more detail.

Alternatively the constricted flow path may be created by any other suitable feature for example the filter chamber may be shaped like an hour glass so as to have an upper portion, a lower portion and a constricted flow path between the two. The sides may be skewed so that one side of the neck or waist is above the other.

The overall filter chamber may rectangular in shape as shown in FIGS. 2 and 3. The filter chamber 40 is rectangular in shape because the housing 2 is also rectangular in shape. Alternatively the filter or filter housing or both may be cylindrical in shape. Alternatively the lower portion of the filter chamber 40 may taper toward a point in one direction such that one wall of the lower portion of the filter chamber is angled toward the bottom of the filter chamber relative to the other wall of the filter chamber, as seen in FIG. 5.

The filter chamber 40 includes at least one baffle. In the preferred embodiment of FIG. 2 the filter chamber contains two baffles 50, 51. Each baffle 50, 51 is disposed at an angle relative to the wall of the filter chamber 40. Preferably the each baffle 50, 51 slopes toward the constricted flow path 12, as indicated in FIG. 3, at an angle of between 20 and 60 degrees relative to an intended vertical orientation of the filter chamber 40. Each baffle 50, 51 may be angled at an angle of 45 degrees downward toward the bottom of the filter chamber. Alternatively the baffles may not be angled toward the bottom of the filter chamber. The baffles 50, 51 could be parallel to each other or angled toward the top of the filter chamber 40.

The baffles 50, 51 extend from the walls of the filter chamber toward each other and divide the filter chamber into an upper and lower portion. The upper portion of the filter chamber includes the mesh strainer, inlet and outlet. The lower portion of the filter chamber acts as a collection chamber for collecting particulate matter dislodged during the use of the filter (described later in detail).

The baffles 50, 51 may be integrally moulded with the filter chamber walls 42.

In an alternate form the filter may have one baffle and a tapered shape of the lower portion of the filter as described previously with reference to FIG. 5 may act as the second "baffle".

The mesh strainer 30 filters out particulate matter from water as it flows to outlet 11. The mesh strainer 30 filters out particulate matter within the water because the size of the holes within the sheet is smaller than the size of the particulate matter. Particles larger that the holes of the mesh strainer become lodged within the mesh strainer 30 or fall into the filter chamber 40. Particles lodging in the mesh strainer could gradually clog the mesh reducing the effectiveness of the filter and restricting or stopping water from flowing out of the filter. The inlet to the filter chamber 40 is formed so that the water flowing into the filter chamber 40 flows across the mesh strainer 30 to create a cross flow 70, as shown in FIG. 3.

Preferably the majority of the water entering the chamber 40 flows in a direction tangential or parallel to the mesh strainer 30. The cross flow 70 across the mesh strainer 30 dislodges particulate matter trapped on the mesh strainer 30. The dislodged matter is either re-filtered by the mesh strainer or settles to the lower portion of the filter chamber due to gravity. The angle of the baffles or filter walls may also direct dislodged particulate matter toward the lower portion of the filter chamber. A partial amount of water that flows across the mesh strainer 30 passes through to the outlet 11 via the mesh strainer. The water that does not pass through outlet 11 flows into the rest of the filter chamber 40 and towards the separation baffles 50, 51.

Any amount of the inlet flow can flow across the mesh strainer 30 to create the cross flow conditions to dislodge particulate matter trapped on the mesh strainer. The cross flow 70 across the mesh strainer 30 cleans the mesh strainer of the filter 1 when the filter is in use. The cleaning of the mesh strainer contributes to a longer lasting filter and goes some way to provide a filter that does not need replacement. In one embodiment of the invention, the strainer mesh can be removed from the filter housing for cleaning or replacement. In a further alternate embodiment the filter may include a settling chamber (not shown) within the filter where the particulate matter washed off the strainer is collected. This settling chamber may be removable for cleaning. In a further alternative form the filter chamber may be detachable from the strainer. In this alternative form the chamber may be removed for cleaning. In the preferred form the filter typically should last a substantial part of the washing appliances life cycle without any need for cleaning or replacement. This is advantageous since the user may not need to clean the filter for most or all of the washing appliance's life cycle. The user may not need to replace the filter or clean it making use of the appliance cheaper and easier.

In preferred embodiments of the invention the upper portion 60 of the filter chamber is shaped to establish a rotational flow 65 in the upper portion of the filter chamber. The flow enters the upper portion of the filter chamber 40 tangential or parallel to the mesh strainer and deflects off the solid boundaries of the chamber, like the walls of the chamber to form a rotational flow 65. The rotational flow may be enhanced by water deflecting off one or both of the baffles 50, 51. The water flowing through the inlet deflects off one wall of the upper portion 60 of the filter chamber 40 down toward the baffles 50, 51. This water then deflects off the baffle or baffles 50, 51 back up toward the mesh strainer. The water flowing through the inlet may flow with several eddies within the flow path. This flow deflects off the walls or baffles or both to cause a large rotational flow to form within the upper portion of the filter chamber 40 due to the deflecting and mixing flow. The geometry of the filter may contribute substantially to develop rotational flows in the upper portion of the filter chamber.

The rotational flow 65 within the upper portion of the filter chamber circulates and flows across the mesh strainer. This rotational flow also goes some way to aide in dislodging particulate matter trapped on the mesh strainer. The particulate matter dislodged from the mesh strainer 30 moves to the lower portion of the filter chamber 40 due to the flow path of the water within the chamber and also partially due to gravity. The rotational flow 65 in the upper portion 60 of the filter chamber 40 assists with movement of the particulate matter from the upper portion 60 of the filter chamber 40 to the lower portion 61 of the filter chamber 40. The particulate material falls along the upper surface of the baffle 51. The sloping walls or baffles leave no horizontal surface in the upper chamber for the particulate to collect.

The rotational flow may be caused due to the inlet flow having a flow momentum and the boundary shape of the filter chamber. The inlet flow has a mass and therefore a flow momentum. As the flow enters the filter and flows parallel to the strainer, part of the flow beings to bounce or deflect off the solid boundaries of the filter chamber 40. Flow momentum is conserved and due to the deflections the flow parallel to the mesh strainer 30 becomes rotational flow. The flow also bounces or deflects off the baffles to form the rotational flow. The shape of the baffles deflects some of the flow upward and some flow downward. This deflection aides in causing rotational flows in the upper 60 and lower 61 parts of the filter chamber 40.

The rotational flow 65, 66 and 67 may also be assisted by the pressure differentials caused within the upper filter chamber. The mesh strainer 30 may begin to clog as more particulate matter gets trapped on the mesh strainer 30. The clogged mesh may cause an increase the back pressure in the filter. This increase in back pressure near the top of the upper portion 60 of the filter chamber may result in higher pressure in the top of the upper portion 60 of the filter chamber. The bottom of the upper portion 60 of the filter chamber may have a lower pressure than near the top. The deflected flow may follow this pressure differential and move in a rotational path around the upper portion 60 of the filter chamber 40.

Some of the rotational flow within the upper portion 60 of the filter chamber 40 flows downward through the constricted flow path into the lower portion of the filter chamber. This may be influenced by the orientation of the filter or by a possible pressure difference between the upper and lower portions of the filter chamber 40. The flow moving from the upper portion 60 of the filter chamber to the lower portion 61 helps to carry some of the particulate matter from the upper portion 60 of the filter chamber 40 to the lower portion 61 of the filter chamber 40, aiding particulate matter settling to the lower portion 61 of the filter chamber. The particulate matter settling to the lower portion of filter may be due to the lower flow rates in the lower portion of the filter, the flow path of the liquid within the filter chamber, relative density differences between water and particulate matter and partially due to gravity.

The lower portion 61 of the filter chamber 40 may also be shaped to establish a rotational flow within the lower portion of the filter chamber. The lower portion 61 of the filter chamber 40 may have parallel walls (as in FIG. 2) or alternatively may taper toward a point (as seen in FIG. 5). Rotational flow 66 in the lower portion 61 of the filter chamber 40 may form for the same reasons as described above.

Water flowing into the lower portion 61 of the filter chamber 40 may deflect off the walls of the lower portion of the filter chamber 40 or off the baffles or both and mixing of flow due to this deflection may cause a rotational flow to be established within the lower portion of the filter chamber 40. Rotational flow within the lower portion of the filter chamber may also be caused due to the pressure differences within the upper and lower parts of the lower portion of the filter chamber. The flow in the lower portion may be turbulent or laminar. Rotational flows can be formed within the lower portion of the filter chamber in the presence of both types of flow individually or in combination The rotational flow 66 in the lower portion of the filter chamber 40 is preferably contra-rotational to the flow in the upper portion of the filter chamber 40. The contra-rotational flow 66 assists to carry particulate matter to the lower portion of the filter chamber as particulate matter flows into the lower portion of the filter chamber 40. In one form the flow within the lower portion 61 of the filter chamber 40 forms two zones of rotational flow, the flow in one zone being contra-rotational 66 to the flow in the upper portion 60 of the filter chamber while the rotational flow 67 in the other zone rotating in the same direct as the flow in the upper portion 60 of the filter chamber 40. The two zones are formed due to flow deflecting in different directions due to the angle of the baffles 50, 51 in the filter chamber 40 and the flows deflecting off the baffles and the walls of the lower portion 61 of the filter chamber 40. In the illustrated filter of FIG. 2, the water flows in to the lower portion of the filter chamber at approximately 45 degrees relative to the base of the filter chamber. The angle of the inflow combined with the deflection off the baffles or the walls of the lower portion of the filter chamber or both and the mixing of flows causes two zones of contra-rotating flows to form as shown in FIG. 3. The two zones of rotating flows aides in more particulate matter being moved toward the bottom of the lower portion 61 of the filter chamber 40.

The flow velocity in the lower portion 61 of the filter chamber may be less than the velocity of the flows in the upper portion 60 of the filter chamber 40. This lower flow velocity may assist in separating particulate matter from the flow in the lower portion 61 of the filter chamber 40. The particulate matter may separate out of the flow because the relative density of the particulate matter is significantly higher or lower than the density of the fluid. This difference in relative density may influence and may cause the particulate matter to separate out of the flow in the lower portion of the filter chamber.

In the preferred embodiment there are two baffles 50, 51 within the filter chamber 40. Two baffles 50, 51 assist in creating a substantially rotational flow 65, 66 within the upper 60 and lower 61 portions of the filter chamber 40. The upper portion 60 flow is contra rotating to the lower portion 61 flow, for example if there is clockwise flow in the upper portion of the filter chamber, the flow in the lower portion 61 of the filter chamber 40 will be anti-clockwise. This may be influenced by the position of the baffles 50, 51 relative to each other. One baffle 50 is slightly higher than the other along the filter chamber wall 42. The baffles are also angled between 20 to 60 degrees relative to the filter chamber wall 42. In the form illustrated in FIG. 2 the angle of the baffles is approximately 35 degrees extending from the wall of the housing toward the base 90 of the filter chamber 40.

The substantially rotational flows 65 in the upper area result in cleaning of the mesh strainer 30. The substantially rotational flow 65 in the upper portion 60 also assists the particulate matter to move toward the lower portion of the filter chamber 40. The contra rotating flow 66 within the lower portion 61 of the filter chamber moves the particulate matter toward the bottom of the lower portion of the filter chamber. The rotating flow generally may not pick up collected matter from the bottom of the filter chamber 40 until the lower portion 61 of the filter chamber is filled.

The cleaning of the mesh strainer 30 by the rotational flows results in constant pressure being maintained within the filter chamber. Unlike conventional disk and screen filters that gradually increase backpressure as they collect more particulate matter, the filter of the present invention does not suffer from such a problem until the lower portion 61 of filter chamber is filled with particulate matter.

In one alternate form of the filter, the housing may include a removable or accessible collection chamber at the bottom of the filter chamber to collect particulate matter dislodged by the cleaning of the mesh strainer. The collection chamber may include a removable lid to allow a user to empty the contents of the collection chamber once it is full. For example, the lower portion 61 of the filter chamber 40 may be accessible to allow a user to empty particulates collected in the lower portion of the filter chamber from the filter chamber.

The collection chamber may include a transparent window disposed on the lower portion of the filter chamber to allow a user to look into the collection chamber to determine if it is full or not.

Alternatively the collection chamber may be a separate chamber that is detachable from the filter chamber and housing. The collection chamber may be formed from a moulded plastics material similar to the housing. The housing may be substantially transparent, to allow anyone to view the filter chamber and collection chamber.

The filter may be used in a clothes laundering machine, for example in the Aquasmart washing machine of Fisher and Paykel Appliances, the filter may be used to filter out solids and particulate matter from re-circulated wash water. This is illustrated in block form in FIG. 6. The system includes a washing tub 800. The tub drains to a re-circulation pump 801 to pump out wash water. The filter 803 is connected to the re-circulation pump 801 to filter out particulate matter. Its primary purpose is to filter out particulate matter and lint during the laundering process. The structure and operation of the filter of the second embodiment may be identical to that described above, however the filter may advantageously include the accessible collection chamber, or may have no division in the filter chamber. Please refer to the description above for the filter structure and filter operation.

Figure 6:
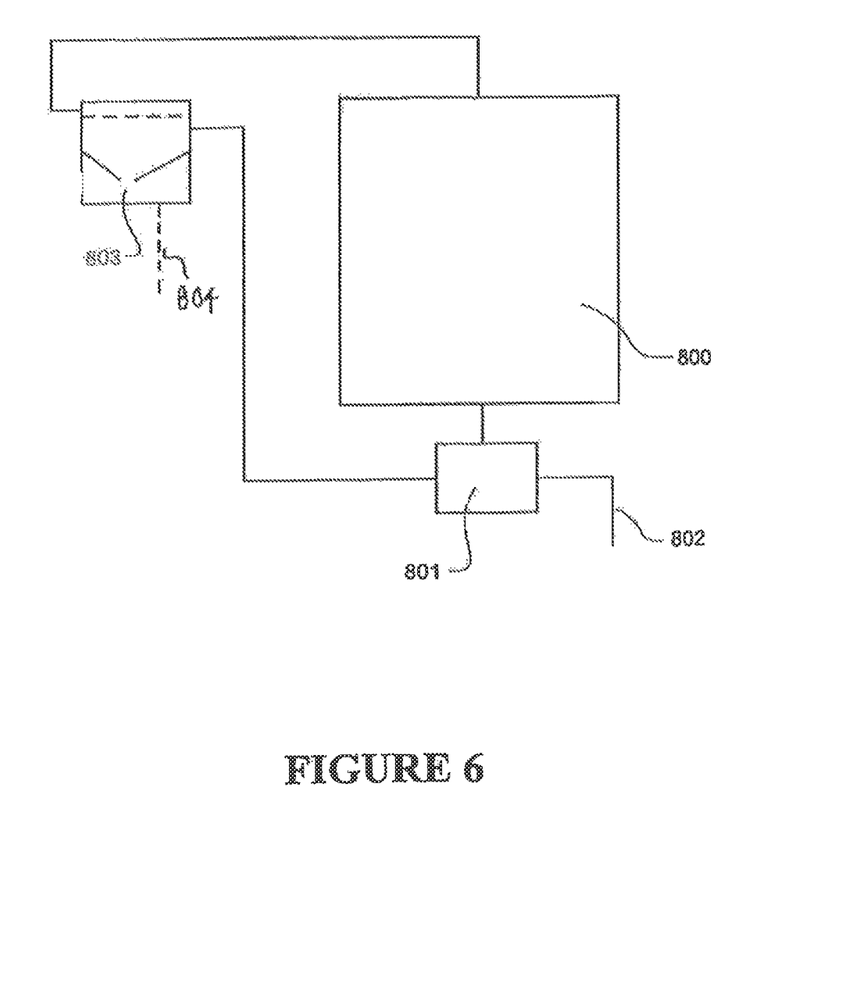
FIG. 6 is a block diagram illustrating the location of a filter in a washing machine wash recirculation system.

In the illustrated arrangement the wash pump also serves as a drain pump according to the direction of the operation or by operation of a flap valve. When the pump operates as a drain pump it delivers liquids from the tub 800 to the drain line 802. At this time filter 803 experiences substantial suction through the inlet.

Lint is always present in the re-circulated wash water. This lint is pumped through the filter 803 as the wash water is re-circulated. The filter 803 may filter out substantial amounts of lint from the re-circulated wash water. A substantial amount of lint can be entrained in the mesh strainer of the filter. Some of the entrained lint may not be cleaned off by cross flow and rotational flows across the mesh strainer. The suction created due to pump 801 acting as a drain pump may suck out substantial amounts of the entrained lint through the inlet and out through the drain line 802. The suction may suck out all the lint trapped on the mesh strainer. Such a characteristic adds to the cleaning of the mesh strainer. The filter capacity of the filter is governed by the volume of the filter chamber volume, and not on the mesh strainer area, thus again resulting in longer lasting filtering.

In an alternate form, the filter for the laundry operation may be cylindrical in shape. The outlet side of the laundry filter may be re-directed back into the wash. The filter may also include a second drain outlet 804 near the bottom or at the bottom of the filter. The second drain outlet allows any collected lint to be removed from the filter chamber by gravity or by the flow or the water out of the second drain.

While the invention is susceptible to embodiment in different forms, specific embodiments are described in this specification with respect to the drawings. The present disclosure is to be considered an exemplification of the principles of the invention, and is not intended to limit the invention or the scope of the invention to that as illustrated or described herein.

The invention claimed is:

1. A filter for use in a dishwasher, the filter comprising:
a filter chamber with an inlet through which water enters the filter chamber and an outlet to discharge filtered water, both the inlet and the outlet located in an upper portion of the filter chamber with the outlet above the inlet,
a mesh strainer having an underside, all of the mesh strainer being located above the water inlet, below the water outlet, and in the upper portion of the filter chamber and oriented relative to the water inlet such that water flowing into the filter chamber from the inlet flows across the underside of the mesh strainer, the mesh strainer filtering particulate matter from water flowing upwardly through the mesh strainer to the outlet, wherein in use
the flow of water across the underside of the mesh strainer causes particulate matter trapped on the underside of the mesh strainer to be dislodged, and dislodged matter settling to a lower portion of the filter chamber below the upper portion, and wherein
the upper portion of the filter chamber is substantially but not completely divided from the lower portion of the filter chamber, with a constricted flow path between the upper and lower portions.

2. A filter for use in a dishwasher as claimed in claim 1, wherein the inlet is formed so that the direction of flow through the inlet is parallel to the underside of the mesh strainer to be directed across the underside of the mesh strainer to dislodge particulate matter trapped in said mesh strainer.

3. A filter for use in a dishwasher as claimed in claim 1, wherein a baffle divides the filter chamber into the upper and the lower portions, and the constricted flow path passes the baffle.

4. A filter for use in a dishwasher as claimed in claim 3, wherein the baffle is angled toward the bottom of the filter chamber at an angle between 20 degrees and 90 degrees relative to a vertical wall of the filter chamber, so as to guide at least part of a flow of water within the filter chamber toward the lower portion of the filter chamber.

5. A filter for use in a dishwasher as claimed in claim 3, wherein side walls of the upper portion of the filter chamber and the baffle are arranged so as to cause a rotational flow within the upper portion of the filter chamber.

6. A filter for use in a dishwasher as claimed in claim 1, wherein the inlet is arranged so that the direction of flow through the inlet is tangential to the underside of the mesh strainer to be directed across the underside of the mesh strainer and to deflect off walls of the filter chamber to form a rotational flow.

7. A filter for use in a dishwasher as claimed in claim 5, wherein the rotational flow of water within the upper portion of the filter chamber passes across the mesh strainer.

8. A filter for use in a dishwasher as claimed in claim 1, wherein the lower portion of the filter chamber tapers toward a point in one direction such that one wall of the lower portion of the filter chamber is angled toward the bottom of the filter chamber relative to the other wall.

9. A filter for use in a dishwasher as claimed in claim 5, wherein side walls of the lower portion of the filter chamber and the baffle are arranged so as to establish a rotational flow within the lower portion of the filter chamber.

10. A filter for use in a dishwasher as claimed in claim 9, wherein side walls of the upper portion, the side walls of the lower portion and the baffle are arranged so as to establish a rotational flow within the lower portion of the filter chamber which is contra-rotating with respect to the direction of rotational flow in the upper portion of the filter chamber.

11. A filter for use in a dishwasher as claimed in claim 9, wherein side walls of the upper portion, the side walls of the lower portion and the baffle are arranged so as to establish two zones of rotational flow within the lower portion of the filter chamber, the flow in one zone contra-rotating with respect to the direction of rotational flow in the upper portion of the filter chamber while the direction of rotational flow in the other zone being in the same direction as the flow in the upper portion of the filter chamber.

12. A filter for use in a dishwasher as claimed in claim 1, wherein the filter includes a substantially transparent wall portion disposed about the lower portion of the filter chamber.

13. A dishwasher including a water softener and a filter upstream of the water softener, the filter comprising:
a filter chamber with an inlet through which water enters the filter chamber and an outlet to discharge filtered water, both the inlet and the outlet located in an upper portion of the filter chamber with the outlet above the inlet; and a mesh strainer having an underside, all of the mesh strainer being located above the water inlet, below the water outlet, and in the upper portion of the filter chamber and oriented relative to the water inlet such that water flowing into the filter chamber from the inlet flows across the underside of the mesh strainer, the mesh strainer filtering particulate matter from water flowing upwardly through the mesh strainer to the outlet, wherein in use the flow of water across the underside of the mesh strainer causes particulate matter trapped on the underside of the mesh strainer to be dislodged, and dislodged matter settling to a lower portion of the filter chamber below the upper portion.

14. A clothes washing appliance, including a filter in line with a re-circulating wash pump, the filter comprising:

a filter chamber with an inlet through which water enters the filter chamber and an outlet to discharge filtered water, both the inlet and the outlet located in an upper portion of the filter chamber with the outlet above the inlet;

a mesh strainer having an underside, all of the mesh strainer being located above the water inlet, below the water outlet, and in the upper portion of the filter chamber and oriented relative to the water inlet such that water flowing into the filter chamber from the inlet flows across the underside of the mesh strainer, the mesh strainer filtering particulate matter from water flowing upwardly through the mesh strainer to the outlet, wherein in use the flow of water across the underside of the mesh strainer causes particulate matter trapped on the underside of the mesh strainer to be dislodged, and dislodged matter settling to a lower portion of the filter chamber below the upper portion, and wherein the upper portion of the filter chamber is substantially but not completely divided from the lower portion of the filter chamber, with a constricted flow path between the upper and lower portions.

15. A clothes washing appliance as claimed in claim 14, wherein suction through the inlet causes substantial amounts of particulate matter trapped within the mesh strainer to be sucked out of the mesh strainer and out through the inlet.

16. A clothes washing appliance as claimed in claim 14, wherein said filter includes a second outlet within the lower portion, said second outlet allowing particulate matter to be removed from the lower portion by a secondary flow out of said second outlet.

* * * * *